Patented May 24, 1949

2,470,911

UNITED STATES PATENT OFFICE 2,470,911

PREPARATION OF GRANULAR POLYMERIZATION PRODUCTS OF VINYL HALIDES

Massimo Baer, Springfield, Mass., assignor to Monsanto Chemical Company, St. Louis, Mo., a corporation of Delaware No Drawing. Application December 11, 1947, Serial No. 791,165

9 Claims. (Cl. 260—78.5)

This invention relates to the polymerization of vinyl halide-containing materials. More particularly, this invention relates to the preparation of polymers and copolymers of vinyl halides in granular form.

It has been suggested that aqueous dispersions of vinyl compounds be subjected to polymerizing conditions in order to produce polymeric materials in granular form. Various dispersing agents have been suggested for this purpose, but have been subject to certain difficulties. For example, when salts are used as dispersing agents, a serious problem arises in attempting to remove the dispersing agent from the polymeric material. Certain dispersing agents are undesirable since they detract from the stability of the polymeric product.

It is an object of this invention to provide a new process for producing polymers from vinyl halide-containing materials. It is a particular object of this invention to provide a process for polymerizing vinyl halide-containing materials to form granular polymeric products.

These and other objects are attained according to this invention by polymerizing an aqueous dispersing of vinyl halide-containing material in the presence of a heteropolymer of vinyl methyl ether and maleic acid or anhydride, said heteropolymer being free from salt groups and being dissolved in the aqueous phase. More particularly, a dilute aqueous solution of a heteropolymer of maleic acid or anhydride and vinyl methyl ether is used as a dispersion medium for polymerizing vinyl halide-containing materials to form granular products.

The following examples in Table I are illustrative of the present invention, but are not to be considered as limitative thereof. Where parts are mentioned, they are parts by weight. In each example in Table I, the procedure used is that given below.

200 parts of water are placed in a glass-lined autoclave and then the indicated heteropolymer of vinyl methyl ether and maleic anhydride in the amount shown, is added and dissolved in the water by heating and stirring the mixture. Thereafter, 0.2 part of lauroyl peroxide is introduced and the air in the autoclave is swept out with vinyl chloride gas. The autoclave is then sealed and 100 parts of vinyl chloride monomer are introduced. The resulting mixture is heated and stirred at 50° C. for 18 hours. As a result of this treatment, substantially all of the vinyl chloride is polymerized, i. e., more than 95%. The polymeric products which comprise powders possessing varying degrees of coarseness are recovered from the suspending medium by centrifuging the product. The recovered polymers are washed with water and dried.

TABLE I

| Example | Heteropolymer Type | Amount (per cent based on the vinyl chloride) | Polymer |
|---|---|---|---|
| I | Heteropolymer C | 0.06 | Coarse powder. |
| II | do | 0.12 | Do. |
| III | do | 0.18 | Powder. |
| IV | do | 0.25 | Do. |
| V | Heteropolymer A | 0.06 | Coarse powder. |
| VI | do | 0.12 | Do. |
| VII | do | 0.18 | Do. |
| VIII | do | 0.24 | Powder. |
| IX | do | 0.4 | Do. |
| X | Heteropolymer D | 0.06 | Rather coarse powder. |
| XI | do | 0.12 | Powder. |
| XII | do | 0.18 | Do. |
| XIII | do | 0.24 | Do. |

In contrast to the prior products made by suspension polymerization in the presence of metallic salts as suspending agents, sheets and other articles free from haze and having exceptionally good electrical properties may be manufactured from the polymerization products of this invention as illustrated by the examples without subjecting the products to the extensive and expensive washing operations necessary when such prior products are used. Furthermore, the products of the invention are readily stabilized against the action of heat and light.

In carrying out the process of the invention, the polymerizing temperature may be substantially varied and the temperature employed is governed by the particular characteristics desired in the polymeric material and the nature of the material being polymerized. In the case of vinyl halides and many mixtures of vinyl halides and materials copolymerizable therewith, temperatures of 30–100° C. are usually employed. Usually, only a small concentration of the dispersing agent of the invention is necessary. For example, 0.005–2.0% and, more particularly, 0.01–0.5% based on the amount of water used, is usually sufficient. However, larger amounts may be employed when desired, for example, up to the limit of solubility of the heteropolymer in the water. The optimum quantity of the dispersing agent depends upon a number of factors, for example, the ratio of water to monomer. Thus, as the water:monomer ratio is increased, the ratio of suspending agent to water may be decreased. Another factor affecting the amount of the suspending agent required is the rate at which the particular charge polymerizes. In general, the faster the rate of polymerization, the smaller is the amount of suspending agent required. Other factors affecting the optimum amount of suspending agent include the degree of fineness desired in the polymeric product and the speed of agitation.

As indicated by the examples in Table I, the degree of fineness of the polymer powder is dependent in part on the amount of the heteropolymer. Usually, it is found that there is an optimum mount of heteropolymer needed to produce a minimum particle size and amounts greater or less produce an increase in particle size. However, this increase in particle size is more noticeable as the amount of heteropolymer is decreased than when it is increased.

It is also noted that the higher the molecular weight of the heteropolymer (as indicated by viscosities of solutions thereof), the smaller the particle size. This is demonstrated by comparing the results in Examples X–XIII with those in Examples I–IX. Thus, a smaller amount of heteropolymer D is required to avoid a coarse powder than when the heteropolymers A and C are used.

In Examples I–XIII where a product is characterized as a powder, it is sufficiently fine to pass through a 60-mesh screen. Where the products are characterized as coarse powders, a substantial amount does not pass through a 60-mesh screen.

In carrying out the polymerization process of the invention, it is generally preferred that a water:monomer weight ratio of at least 1:1 be used, but generally, the water:monomer ratio does not exceed 9:1. The dispersing agent concentrations mentioned above may be used within these limits of water:monomer ratios.

The vinyl methyl ether-maleic acid or anhydride heteropolymers may be prepared by the usual methods for polymerizing unsaturated materials, as for example, polymerization in solution, in mass, or in a liquid which is a solvent for the monomeric materials, but not for the heteropolymers. The molecular weight of the dispersing agent as evidenced by the specific viscosity of dilute solutions thereof may be substantially varied, for example, by employing various polymerization temperatures, types of catalyst, amounts of catalyst, etc.

In Table II are set forth illustrative examples of the preparation of heteropolymers in the presence of a liquid which is a solvent for the monomeric materials but not for the heteropolymer. The product obtained as heteropolymer A is used in Examples V–IX, heteropolymer C is used in Examples I–IV and heteropolymer D is used in Examples X–XIII.

The procedure used in each example in Table II is given below.

The several ingredients are placed in a glass vessel capable of withstanding pressure. Before starting the polymerization, the air above the charge is swept out by means of an inert gas such as nitrogen or vinyl methyl ether gas. Thereafter, the charge is heated at the temperature and for the period required for substantially complete polymerization, i. e., 95% or more. The products are obtained in the form of gels from which the benzene is eliminated by evaporation. The resulting polymers are very fine white water-soluble powders.

TABLE II

*Heteropolymers prepared in the presence of a material which is a solvent for the monomeric materials but a non-solvent for the polymer*

| Hetero-polymer | Maleic Anhydride, grams | Vinyl Methyl Ether, grams | Benzoyl Peroxide, grams | Benzene, cc. | Temperature °C. | Duration Hours |
|---|---|---|---|---|---|---|
| A | 24.5 | 14.5 | 0.0195 | 25 | 40 / 43 | 20 / 24 |
| B | 24.5 | 14.5 | 0.039 | 25 | 49 | 40 |
| C | 24.5 | 14.5 | 0.0195 | 25 | 36 | 64 |
| D | 24.5 | 14.5 | 0.0195 | 15 | 50 | 24 |

When heteropolymers are desired which have an especially high molecular weight, the amount of benzene should be reduced as much as possible while at the same time having a sufficient amount present so that the product comprises a gel. For example, heteropolymers A and C have relative viscosities of 1.7 in an 0.2% aqueous solution at 25° C., whereas, heteropoylmer D in which a smaller amount of benzene is used, has a relative viscosity of 2.5 under the same conditions.

If desired, the heteropolymer may be prepared by mass polymerization as indicated above. In Table III below are given examples of this method of polymerization. In each example the procedure is the same as in the examples in Table II except for the omission of the benzene and other variations indicated in Table III. The products in each case are clear, pale yellow, water-soluble, solid polymers.

TABLE III

*Heteropolymers prepared by mass polymerization*

| Hetero-polymer | Maleic Anhydride, grams | Vinyl Methyl Ether, grams | Benzoyl Peroxide, grams | Temperature °C. | Duration Hours |
|---|---|---|---|---|---|
| E | 24.5 | 14.5 | 0.008 | 45 | 72 |
| F | 14.0 | 8.3 | 0.007 | 40 / 43 | 20 / 24 |
| G | 14.0 | 8.3 | 0.013 | 49 | 40 |

In preparing the heteropolymers, it is preferred to use maleic anhydride rather than maleic acid due primarily to the faster polymerization rate obtained and greater solubility of maleic anhydride. On dissolving heteropolymers made with maleic anhydride in water, the anhydride groups are converted to carboxyl groups.

In preparing the heteroplymers in the presence of a solvent for the monomers which is a non-solvent for the polymer, such liquids may be used as benzene, toluene, xylene, chlorobenzene, trichlorethylene, hexane, etc.

Various molar ratios of vinyl methyl ether to maleic acid or anhydride may be employed in preparing the heteropolymers, e. g., from 1:9 to 9:1. Usually, it is preferred that the molar ratio of maleic acid or anhydride to vinyl methyl ether is about 1:1 since the use of an excess of either component may be undesirable in some cases.

As indicated above, it is desirable in carrying out the polymerization of vinyl halide-containing materials to substantially free the atmosphere above the polymerizing mixture from oxygen by replacing the air prior to polymerization with carbon dioxide, vinyl chloride, nitrogen or other inert gas. This may be done by sweeping out the air with a stream of inert gas or by subjecting the polymerization charge to partial vacuum, thereby sweeping out the air with vapors from the charge.

The process of this invention is useful in the polymerization of vinyl halides, e. g., vinyl chloride, vinyl bromide, etc. and the copolymerization of vinyl halides with such copolymerizable water-insoluble unsaturated compounds as vinyl esters of carboxylic acids, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; viny aromatic compounds, for example, styrene, ortho-chlorostyrene, para-chlorostyrene, 2,5-dichlorostyrene, 2,4-dichlorostyrene, para-ethyl styrene, divinyl benzene, vinyl naphthalene, alpha-methyl styrene, dienes, such as butadiene, chloroprene; amides, such as acrylic acid amide, acrylic acid anilide; nitriles, such as acrylic acid nitrile; esters of $\alpha$-$\beta$-unsaturated carboxylic acids, for example, the methyl, ethyl, propyl, butyl, amyl, hexyl, heptyl, octyl, allyl, methallyl and phenyl esters of maleic, crotonic, itaconic, fumaric acids and the like. Preferably, in the case of copolymerization, a predominate portion, i. e., more than 50% by weight, of the mixture of monomers is a vinyl halide, especially vinyl chloride.

A particularly preferred embodiment of the invention comprises the polymerization of a mixture of vinyl chloride and an ester of an $\alpha,\beta$-unsaturated dicarboxylic acid such as diethyl maleate, in which 5-20 parts by weight of diethyl maleate are used for every 95-80 parts by weight of vinyl chloride. Among the preferred esters of $\alpha,\beta$-unsaturated dicarboxylic acids are the alkyl esters in which the alkyl group contains 2-8 carbon atoms.

In place of lauroyl peroxide used in the examples, other water-insoluble catalysts may be used such as benzoyl peroxide, ditertiary butyl peroxide, oleyl peroxide, toluyl peroxide and the like. Mixtures of two, three or more to these and other catalysts may be used when desired. In certain cases the catalyst may be eliminated, for example, when rapid polymerization is obtained in the absence of catalyst. In certain cases, the action of light may be helpful in expediting the polymerization.

The above catalysts are also illustrative of catalysts which may be used in making the heteropolymer dispersing agent.

The foregoing description is given in illustration and not in limitation of the invention as set forth in the appended claims.

What is claimed is:

1. In a process for preparing polymerization products in granular form, the step which comprises polymerizing an aqueous dispersion of a polymerizable material containing a vinyl halide from the group consisting of vinyl chloride and vinyl bromide in the presence of, as a dispersing agent, a heteropolymer of vinyl methyl ether and a compound selected from the group consisting of maleic acid and maleic anhydride dissolved in the aqueous phase, said heteropolymer being free from salt groups.

2. A process as defined in claim 1 in which the polymerizable material is vinyl chloride.

3. A process as defined in claim 1 in which the heteropolymer is present in the proportion of 0.005 to 2.0% based on the amount of water.

4. In a process for preparing polyvinyl chloride-containing polymerization products in granular form, the step which comprises polymerizing an aqueous dispersion containing vinyl chloride, in the presence of 0.005 to 2.0% based on the water present, of a heteropolymer of vinyl methyl ether and a compound selected from the group consisting of maleic acid and maleic anhydride dissolved in the aqueous phase, said heteropolymer being free from salt groups.

5. A process as defined in claim 4 in which a peroxide catalyst is present.

6. A process as defined in claim 4 in which lauroyl peroxide is present as a catalyst.

7. In a process for preparing polymerization products in granular form, the step which comprises polymerizing in an aqueous dispersion a mixture of vinyl chloride and an alkyl ester of an alpha,beta-unsaturated dicarboxylic acid in the presence of, as a dispersing agent, a heteropolymer of vinyl methyl ether and a compound selected from the group consisting of maleic acid and maleic anhydride, dissolved in the aqueous phase, said heteropolymer being free from salt groups.

8. A process as defined in claim 7 in which the alkyl ester of alpha,beta-unsaturated dicarboxylic acid is diethyl maleate.

9. In a process for preparing polymerization products in granular form, the step which comprises polymerizing in an aqueous dispersion a mixture of vinyl chloride and diethyl maleate in the presence of 0.005 to 2.0%, based on the amount of water, of a heteropolymer of equimolar proportions of vinyl methyl ether and a compound selected from the group consisting of maleic acid and maleic anhydride dissolved in the aqueous phase, said heteropolymer being free from salt groups, and lauroyl peroxide as a catalyst.

MASSIMO BAER.

No references cited.